March 31, 1970    J. E. ALDRIDGE ETAL    3,503,325
CLAMP FOR BALE WRAP CARTON
Filed Aug. 22, 1968

INVENTORS
JAMES E. ALDRIDGE
ANDREW P. CARTER
BY

ATTORNEY

United States Patent Office 3,503,325
Patented Mar. 31, 1970

3,503,325
CLAMP FOR BALE WRAP CARTON
James E. Aldridge, Trinity, and Andrew P. Carter, Decatur, Ala., assignors to Monsanto Company, St. Louis, Mo., a corporation of Delaware
Filed Aug. 22, 1968, Ser. No. 754,674
Int. Cl. B30b 9/00
U.S. Cl. 100—102                                2 Claims

ABSTRACT OF THE DISCLOSURE

The novel clamping device retains a bale wrap carton in position during the lowering of a bale press follow block assembly into its recess and releases the same upon emerging from the recess thereby relieving the operator from the duty of manually holding the carton during the baling operation.

BACKGROUND OF THE INVENTION

Field of the invention

This invention relates to a novel clamping device for a bale press apparatus. In particular, this invention relates to a retaining device for securing a bale wrap carton in position during the receding phase of the follow block assembly.

Description of the prior art

Heretofore, bale press operators had to manually position and physically hold the bale wrap carton on conventional follow block assemblies in the baling of staple fibers. In particular, due to the follow block receding into a recess or well, the operator would have to station himself upon the block by some bodily means, that is, position himself in full or in part upon the descending assembly so as to keep the bale wrap in proper position. Aside from the calisthenical rewards achieved by such manual manipulations the general practice is both dangerous and time consuming. The instant invention eliminates these problems to the operator during the follow block recession and allows carefree operation during that phase.

SUMMARY OF THE INVENTION

The instant invention relates to an improvement in bale press apparatus, whereby the danger of any operator riding on the follow block assembly of a baling machine is eliminated. The novel improvement comprises hinged plates, spring biased, attached to various corners of the follow block so that as the follow block descends into its recess, the plates are wedged inwardly against the extended flaps of the bale wrap carton to hold it securely in place. In actual operation, as the whole follow block assembly descends into a pit or recess, an engaging head comes into contact with the walls of the recess, compressing a spring interposingly coupling the engaging means and a movable clamping plate so as to urge said plate toward a stationary stop member thereby binding flaps of a bale wrap carton therebetween and retaining it in proper position. Upon emerging from the recess the tension is released, the movable portion of the novel device thrown free and suspended away from the block assembly.

An object of this invention is to provide a means to retain a bale wrap carton in proper position during the receding of the follow block phase of operation and to free the operator from manually manipulating the carton.

A further object of this invention is to provide an apparatus to maintain a bale wrap carton in proper position during recession relieving any operator from manually guiding said bale.

A further object of this invention is to provide an apparatus to retain a bale wrap carton during the receding phase of a follower block thereby providing a safety feature for the operator during that phase. Other objects and advantages will be apparent from the following description.

In essence, this invention relates to an apparatus for retaining a bale wrap carton in position during follow block recession which comprises: a follow block assembly for supporting a bale; a stop member, said member secured vertically to the follower block assembly; a clamping plate adjacent the stop member and parallel thereto, movably mounted at its base; an engaging head attached pivotally at its foot to the clamping plate and extending obliquely therefrom; a compression spring biased the clamping plate, interposingly connecting the upper portion of said plate with the engaging head; depressing means for advancing the engaging head forward whereby the clamping plate is actuated by said spring and urged upon the stop member upon recession of the bale block assembly so as to bind at least two flaps of the bale wrap carton.

DESCRIPTION OF THE PREFERRED EMBODIMENT

As bale press techniques are well-known to those skilled in that particular art there is no need to go into baling machine practices. The subject clamping device as to its structural features will be given in more detail in conjunction with conventional baling practice.

Figure 1:
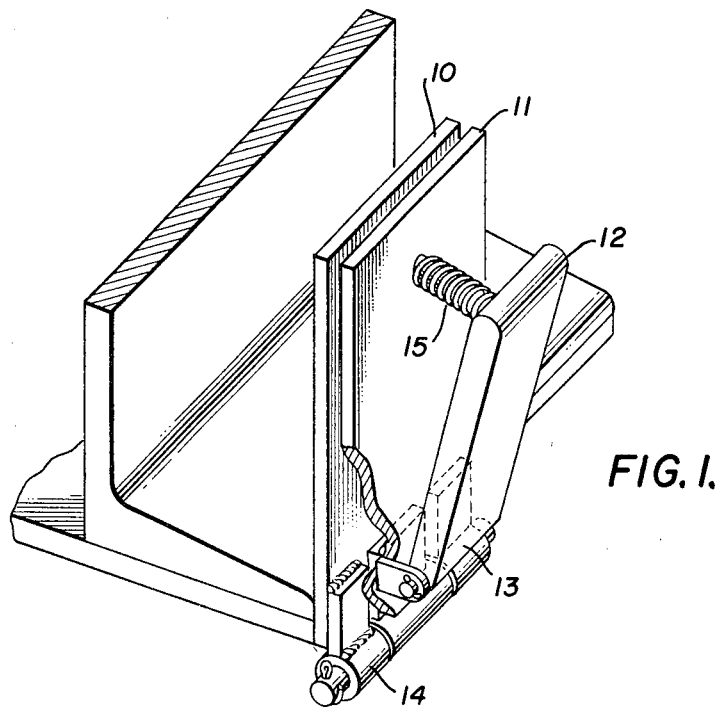
FIGURE 1 shows the novel clamping device of this invention.

FIGURE 1 shows a preferred embodiment and a detailed drawing of the novel clamping apparatus.

Referring now in detail to FIGURE 1, a clamping plate 11 is pivotally attached at its base by a hinge 14 to a stop member 10. An engaging head 12 is likewise pivotally secured by a hinge 13 to the clamping plate 11 and at the other end thereof is brought proximate the clamping plate 11 by means of a compression spring 15 interposingly connecting the upper portion of said plate with the engaging head.

Figure 2:
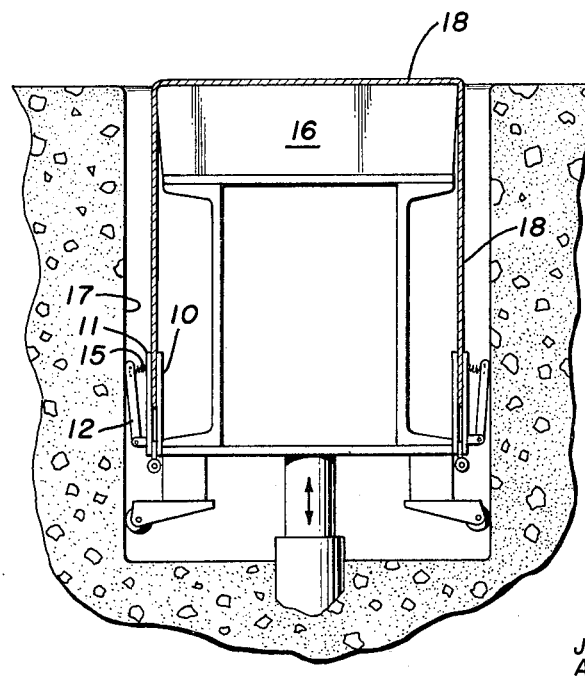
FIGURE 2 shows the device attached to a conventional follow block assembly.

FIGURE 2 depicts the stop member 10 secured to the follow block assembly 16 with the head 12 in engagement with the wall of a pit or well 17 so that the plate 11 co-operates with the member 10 to hold the edge of a bale wrap carton 18 therebetween while the follow block assembly is in the pit or well 17.

The operation of the novel apparatus of this invention is as follows: The hinged plates are attached to the follow block assembly at its four corners. The engaging head 12, which may be made of some suitable metal or plastic material engages the wall of the pit 17 as the follow block is lowered and actuates the compression spring to urge the clamping plate 11 toward the fixed stop member 10. In effect, this causes a clamping action inwardly between the stop member 10 and the clamping plate 11 which retains or grips firmly the bale wrap carton.

The actual size of the clamping device is not critical, it being understood that the width and length of said plates may be reasonably varied depending upon the size of the bale wrap carton.

Although the operation of the present device is to be substantially in a vertical or upright position so that the mere weight of the pivotally movable portion of the apparatus causes the elements 11 and 12 to swing partially away from the member 10 the device may be utilized in a horizontal operated baling machine with only slight modification, viz., maintaining a constant opening between the stop plate and clamping plate for the introduction of the bale wrap carton.

We claim:

1. An apparatus for retaining a bale wrap carton in position during operation of a bale press machine having a follower block assembly adapted to recede into a well which comprises:
    (a) a stop member, said member being secured to the follower block assembly;
    (b) a clamping plate adjacent the stop member and parallel thereto, said plate being movably mounted at one end thereof;
    (c) a head pivotally attached at one end to the clamping plate and extending obliquely therefrom for engaging the wall of the well when the follower block is lowered; and
    (d) a compression spring positioned between the clamping plate and the upper portion of the engaging head, whereby the clamping plate is actuated by said spring and urged toward the stop member to hold the bale wrap carton therebetween when the follower block assembly is in the well.

2. An apparatus as recited in claim 1, in which the clamping plate is pivotally attached at its lower end to the stop member.

References Cited

UNITED STATES PATENTS

| 1,352,345 | 9/1920 | Becker | 100—295 XR |
| 1,913,965 | 6/1933 | Van Vechten | 24—248 XR |

FOREIGN PATENTS 1,204,128  10/1965  Germany.

BILLY J. WILHITE, Primary Examiner

U.S. Cl. X.R.
24—248; 100—295